(12) United States Patent
Malcarne (10) Patent No.: US 8,919,031 B2
(45) Date of Patent: Dec. 30, 2014

(54) ADJUSTABLE FISHING ROD BUTT AND PROCESS OF USE

(71) Applicant: Winthrop Tool LLC, Deep River, CT (US)

(72) Inventor: Frederick Joseph Malcarne, Westbrook, CT (US)

(73) Assignee: Winthrop Tool LLC, Deep River, CT (US)

( * ) Notice: Subject to any disclaimer, the term of this patent is extended or adjusted under 35 U.S.C. 154(b) by 110 days.

(21) Appl. No.: 13/833,026

(22) Filed: Mar. 15, 2013

(65) Prior Publication Data

US 2014/0259862 A1     Sep. 18, 2014

(51) Int. Cl.
*A01K 87/08*     (2006.01)
*A01K 87/00*     (2006.01)
*A01K 87/06*     (2006.01)

(52) U.S. Cl.
CPC ............. *A01K 87/08* (2013.01); *A01K 87/06* (2013.01)
USPC .......................................... 43/23; 43/18.1 CT (58) Field of Classification Search
USPC ................... 43/23, 18.1 CT, 18.1 R
IPC ............................ A01K 87/08,87/00
See application file for complete search history.

(56) References Cited

U.S. PATENT DOCUMENTS 4,796,373 A * 1/1989 Struntz ............................. 43/23
4,858,365 A * 8/1989 Struntz ............................. 43/23
7,454,862 B2 * 11/2008 Markley et al. ............. 43/18.1 R
8,413,366 B2 * 4/2013 Malcarne ..................... 43/18.1 R
2006/0230669 A1 * 10/2006 Markley et al. .................... 43/23

FOREIGN PATENT DOCUMENTS

DE     10202773 A1 * 7/2003 ............. A01K 87/00
JP     2012249527 A * 12/2012 ............. A01K 87/02

OTHER PUBLICATIONS

Machine translation of DE 102773 to Kloeber, Jul. 2003.*
Machine translation of JP 2012249527 to Katayama, Dec. 2012.*

* cited by examiner

*Primary Examiner* — Darren W Ark
*Assistant Examiner* — Kathleen Alker
(74) *Attorney, Agent, or Firm* — Cantor Colburn LLP (57) ABSTRACT

A fishing rod butt for use with a fishing reel and a rod blank and process for operating the butt generally includes depressing a spring-loaded button of a hinge assembly coupling a link end of a first elongate member and a U-shaped end of a second elongate member configured to receive the link end of the first elongate member. The first elongate member includes an open end configured to receive a rod blank and an adjustable reel seat for receiving a fishing rod reel. The spring-loaded button includes an elongate body and at least one transverse member extending from a long axis thereof, wherein depressing the spring-loaded button compresses a biased spring and disengages the at least one transverse member from a first notch within the hinge assembly. An angular relationship between the elongate members can be changed by engaging the at least one transverse member with another notch.

10 Claims, 7 Drawing Sheets

ADJUSTABLE FISHING ROD BUTT AND PROCESS OF USE

BACKGROUND

The present disclosure generally relates fishing rods and more particularly, to an adjustable butt end and reel seat for a fishing rod.

Conventional deep sea sport fishing rods are made of three primary sections, the rod blank, the handle or butt, and the reel seat. Typically, the rod blank is an elongate member and has one end that is intended to be fitted within the butt. The reel seat is commonly secured directly to the butt rather than to the fishing rod itself. The distal end of the butt can be in the form of a gimbal having intersecting notches, which enables the butt to be received within a socket permanently, but movably, mounted on a "fighting chair" on a boat or even on a "fighting belt" secured to a fisherman. In the sport of game fishing, strong forces are often encountered, which are transmitted through the rod to the butt assembly.

Conventional butt ends of fishing rods are either bent (curvilinear) or straight. Straight rods are desirable when a fish is moving away from the rod. On the other hand, bent rods are preferred when the fish is circling or moving transverse to the rod, which distributes the force exerted by the fish and thus enables the angler to use apply increased force on the fish.

Based on the foregoing, there still exists a need for a fishing rod butt that incorporates both straight and curvilinear functionality. Accordingly, it is to solving this and other needs the present disclosure is directed.

BRIEF SUMMARY

Disclosed herein a fishing rod butt for use with a fishing reel and a rod blank and a process for operating an adjustable fishing rod butt.

In one embodiment, the fishing rod butt comprises a first elongate member having an open end configured to receive the rod blank and a link end; a second elongate member having a U-shaped end configured to receive the linking end of the first elongate member; and a hinge assembly coupling the first and second elongate members and configured to releasably lock the first and second elongate members in at least two angular relationships, the hinge assembly comprising a spring-loaded button comprising an elongate body and at least one transverse member extending from a long axis thereof, the at least one transverse member engagable with a notch, wherein at least one spring biases the at least one transverse member into the notch such that depression of the spring loaded button disengages the at least one transverse member from the notch to permit rotational movement of the first elongate member relative to the second elongate member, and wherein the hinge assembly includes at least two of the notches, wherein the at least two notches correspond to a different fixed angle defining the at least two angular relationships.

In another embodiment, a fishing rod butt for use with a fishing reel and a rod blank, comprises at least one elongate member comprising at least one opening extending along a length of the elongate member and dimensioned to accommodate a user's hands when in use. The at least one opening provides increased stability to the end user when in use. In addition, the at least one opening prevents slipping of the butt from the hands when in use.

A process for operating an adjustable fishing rod butt comprises depressing a spring loaded button of a hinge assembly coupling a link end of a first elongate member and a U-shaped end of a second elongate member configured to receive the link end of the first elongate member, the spring loaded button comprising an elongate body and at least one transverse member extending from a long axis thereof, wherein depressing the spring loaded button compresses a biased spring and disengages the at least one transverse member from a first notch within the hinge assembly; changing an angular relationship of the first elongate member to the second elongate member and releasing the spring loaded button during the changing; and engaging the at least one transverse member when aligned with at least one additional notch, wherein the at least one additional notch provides a different angular relationship between the first elongate member to the second elongate member than the first notch.

It is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the present invention. It is important, therefore, that the claims be regarded as including such equivalent constructions insofar as they do not depart from the spirit and scope of the present invention.

Other advantages and capabilities of the invention will become apparent from the following description taken in conjunction with the examples showing aspects of the present invention.

BRIEF DESCRIPTION OF THE SEVERAL VIEWS OF THE DRAWINGS

Referring now to the figures wherein the like elements are numbered alike.

DETAILED DESCRIPTION

Disclosed herein is an adjustable butt and reel seat assembly for a fishing rod. Depending on the intended fishing application, the adjustable butt can be configured to provide a bent (curvilinear) shape or a linear shape. The curvilinear shape provided by the adjustable butt can be utilized to provide a mechanical advantage to the end user during fishing. For example, when fighting relatively large and powerful fish, it is sometimes advantageous to employ an angled rod. The adjustable butt and real seat assembly is formed of a high strength material, such as steel, although in some embodiments, a high strength but substantially lightweight material such as aluminum will be used. Other alloys can be employed.

The fishing rod butt of the present disclosure provides for rapid and easy conversion from a linear form to a curvilinear form as may be desired for the particular fishing condition. The adjustable hinge eliminates the need to purchase two separate fishing rod butts, decreasing cost and efficiency for a user. The push button hinge mechanism described herein is robust and includes fewer parts than conventional hinge mechanisms, which further improves ease of manufacture, assembly, and repair.

Figure 1:
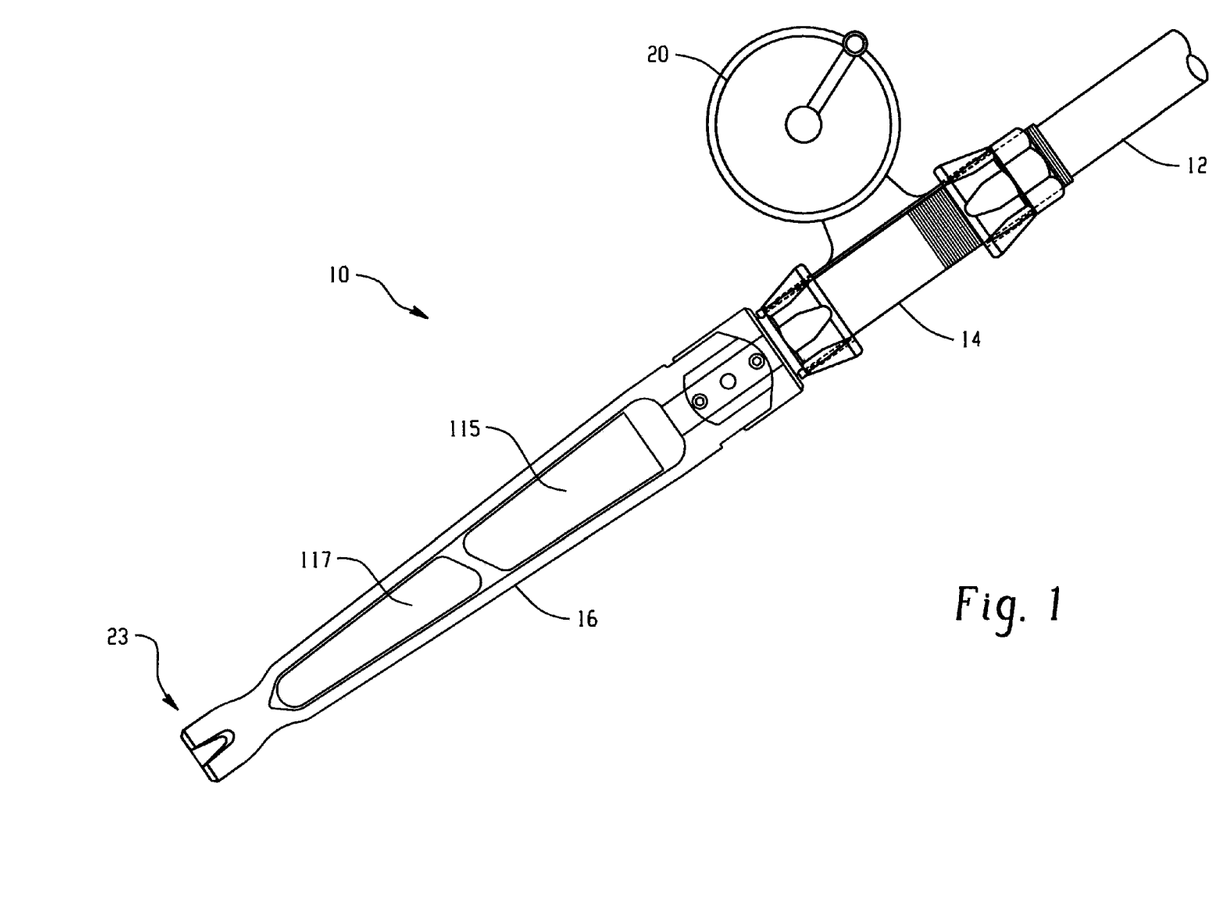
FIG. 1 illustrates an orthogonal view of an adjustable butt for a fishing rod when the butt is set at 0 degrees.
Figure 2:
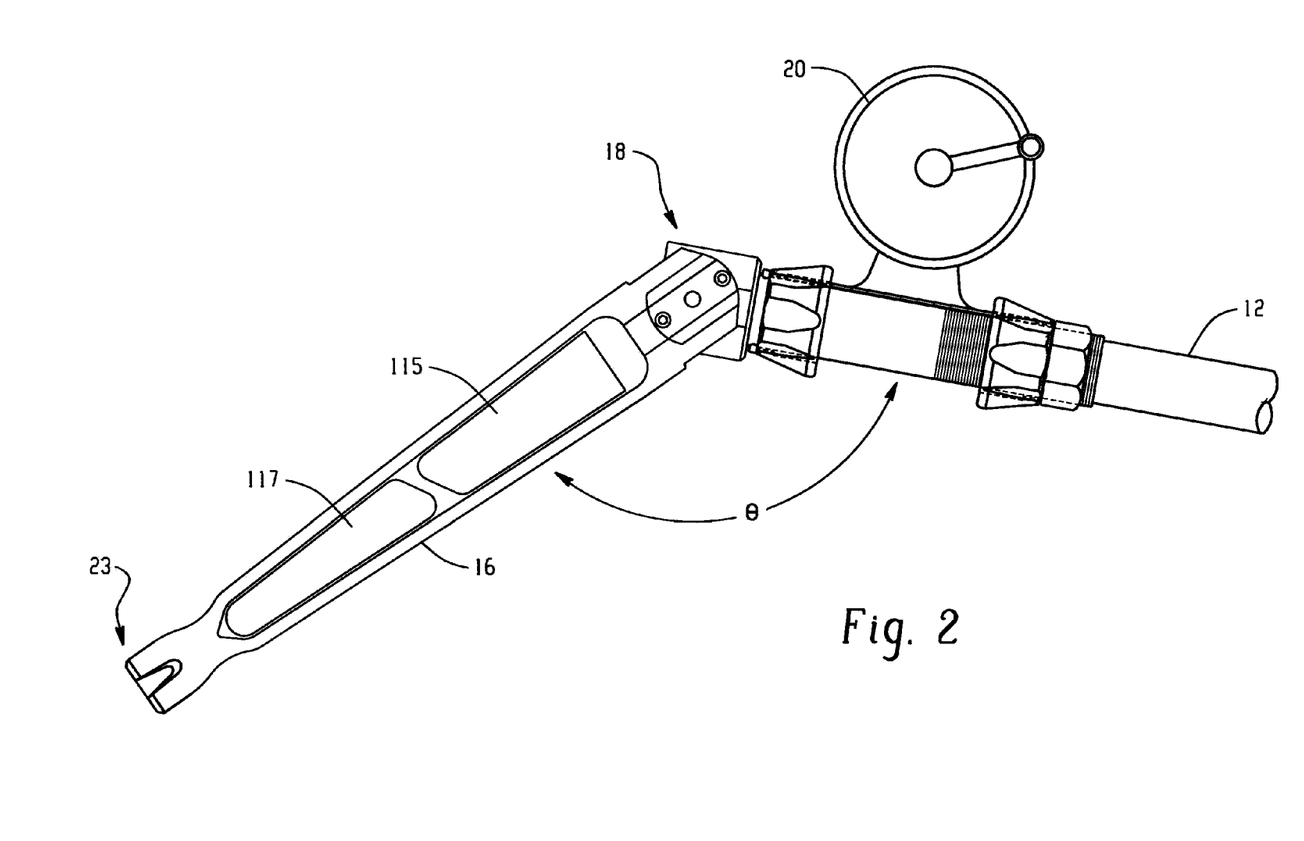
FIG. 2 illustrates an orthogonal view of an adjustable butt for a fishing rod when the butt is set at 45 degrees.

FIGS. 1-2 illustrate orthogonal views of the adjustable butt and reel seat assembly and is generally indicated by reference numeral 10 in accordance with one embodiment for use with fishing reel 20 and a fishing rod blank 12, which are partially shown. FIG. 1 depicts the adjustable butt having a linear shape, whereas FIG. 2 depicts a curvilinear shape, wherein θ is about 45 degrees. The adjustable butt and reel seat assembly 10 generally includes a first elongate member 14 hingeably and lockingly coupled to a second elongate member 16 by a hinge assembly, generally shown at 18. The first and second elongate members 14, 16 are generally cylindrical. Second elongate member 16 may further include one or more openings, e.g., a first opening 115 and a second opening 117 dimensioned to accommodate the general dimensions of a user's hand. As such, these openings can be configured for gripping and controlling the fishing rod butt during use. The size and shape of the openings can be modified as may be desired. Optionally, it should be noted that the number of openings in the second elongate member 16 are not intended to be limited and can include one or multiple openings.

Although the Figures illustrate butt angles (θ) of about 0 (FIG. 1) and about 45 degrees (FIG. 2), it should be noted that the particular angle (or angles) is not intended to be limited. As will be discussed in greater detail below, the hinge assembly 18 can be configured to provide angles other than 0 and about 45 degrees depending on the desired application and hinge design. Moreover, the hinge assembly 18 can be configured to provide the end user with more than one angle to choose from, i.e., a linear shape and more than one angled shape. The second elongate member 16 can include a gimbal 23 to be received within a socket (also referred to as a gimbal nock, not shown), which can be permanently but movably mounted on a fighting chair on a boat, the boat itself, or even on a fighting belt secured to a fisherman. Optionally, the gimbal 23 is in the form a separate detachable component secured to the second elongate member 16 by any suitable means, e.g., press fit, screw fit, and the like.

Figure 3:
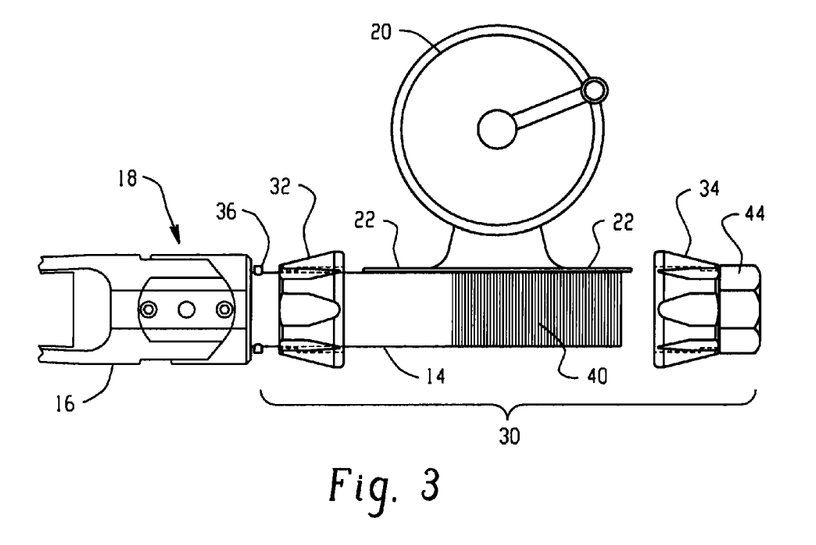
FIG. 3 illustrates a reel seat assembly in accordance with an embodiment of the disclosure, wherein a reel is shown disengaged from the reel seat assembly.
Figure 4:
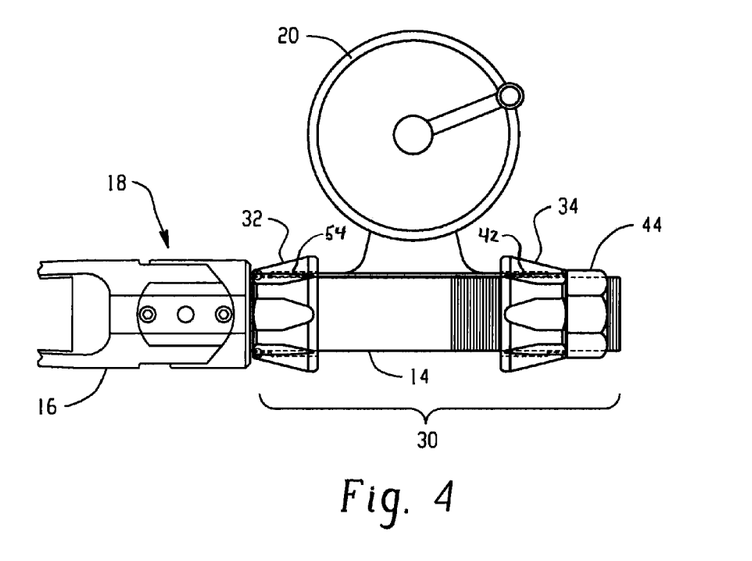
FIG. 4 illustrates a reel seat assembly in accordance with an embodiment of the disclosure, wherein a reel is shown engaged with the reel seat assembly.

As shown more clearly in FIGS. 3-4, the first elongate member 14 includes a reel seat portion 30 for securely retaining the reel 20. The reel seat portion 30 includes a first annular hood 32 and a second annular hood 34. The first annular hood 32 is rotatably disposed about the first elongate member 14 and abuts hinge assembly 18 when in use. The first annular hood 32 is moveable along the longitudinal axis of the first elongate member 14 to permit adjustment to seat variously sized fishing reels. To secure the fishing reel 20 in the reel seat portion 30 at a fixed position, the first elongate member 14 includes a pin 36 at an end proximate to the hinge assembly 18 of the first elongate member 14 and configured to engage a complementary recessed portion 56 in first annular hood 32 (see also FIGS. 5-6). In this manner, the first annular hood 32 is rotatably locked in a fixed position about the first elongate member 14 when engaged with pin 36 as shown in FIG. 4, thereby providing proper placement of the reel 20 on the first elongate member 14 as well as preventing rotation of the reel 20 during use. An exterior threaded zone 40 is formed at the other end of the first elongate member 14 and is configured to movably engage the second annular hood 34 with a second reel tongue of the fishing reel so as to retain the fishing reel within the reel seat portion 30. The interior of the first elongate member 14 at the other end is hollow and is configured to receive the rod blank 12 (shown in FIGS. 1-2). The first and second annular hoods 32 and 34 include recessed portions 54, 42, respectively, (shown in silhouette, see FIG. 4) configured to receive the first and second reel tongues 22 of the reel 20. The second annular hood 34 is optionally coupled to a nut 44, which provides for threaded engagement with threads in the threaded zone 40 to retain the fishing reel when tightened. In one embodiment, nut 44 is a collet nut and is coupled to the second annular hood 34.

Figure 5:
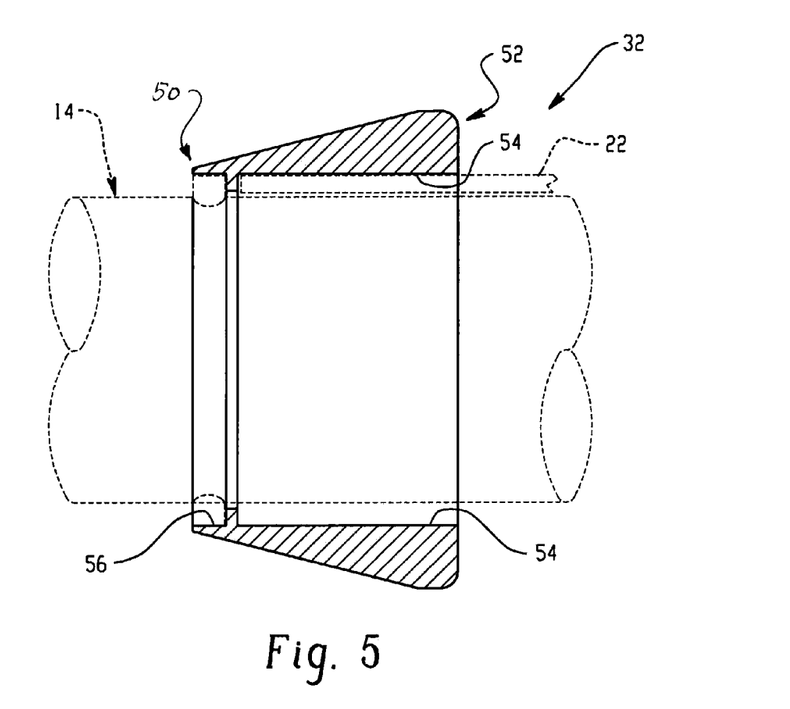
FIG. 5 illustrates a cross sectional view of an annular hood for use with reel seat assembly.
Figure 6:
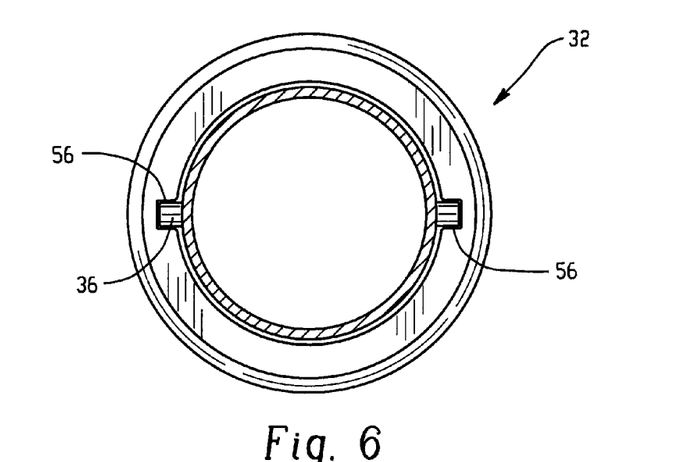
FIG. 6 illustrates an end on view of an annular hood for use with reel seat assembly disposed on an elongate member.

FIGS. 5 and 6 provide cross-sectional and end-on views of the first annular hood 32. As shown, one end 50 of the first annular hood 32 includes a recessed portion 56 configured to receive the pin 36 of the first elongate member 14. Another end 52 includes at least one recessed portion 54 for receiving a reel tongue 22. By engaging the pin 36 in the manner shown, the reel 20 is always seated in the same location on the first elongate member 14 since the presence of the pin prevents rotation of the first annular hood 32. For some embodiments, recessed portion 54 is tapered. The second annular hood 34 includes a similarly shaped recessed portion configured for receiving the second reel tongue 22.

During use, pin 36 is aligned with the recessed portion 56 of the first annular hood 32 to rotatably lock the hood at a fixed position. One of the reel tongues 22 is then inserted into the recessed portion 54 of first annular hood 32 such that the hood 32 is abutting the pin 36 and the hinge assembly 18, wherein further lateral movement against the hinge assembly 18 and pin 36 is prevented. The second annular hood 34, which is optionally coupled to nut 44, is then movably positioned to engage the other reel tongue 22 with the recessed portion (not shown) of the second annular hood 34, thereby retaining reel 20 within the reel seat assembly 30. The nut 44 serves to bias the second annular hood 34 to retain or release a reel disposed within the reel seat assembly 30.

Figure 7:
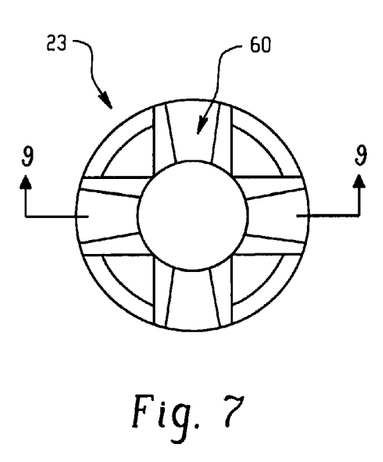
FIGS. 7-9 depict various views of a gimbal disposed at one end of the butt.
Figure 8:
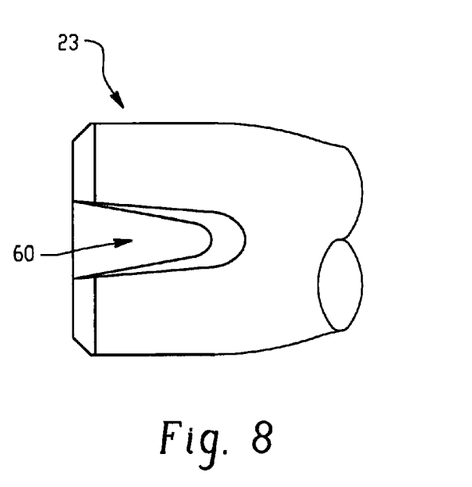
Figure 9:
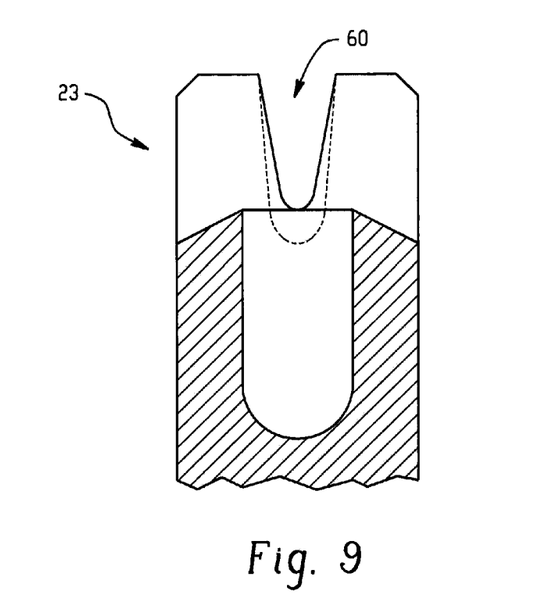

FIGS. 7-9 schematically illustrate various views of the gimbal 23. As noted above, the gimbal 23 includes one or more notches 60 configured to locate a pin (not shown) used in a gimbal nock, which may be located in a fighting chair, fighting harness, or boat. Typically, the notches 60 form a cross-hatch as shown. The gimbal nock and gimbal relationship prevents twisting and turning of the fishing rod during a fight or while using the fishing rod for trolling.

FIGS. 10-14 depict various views of a hinge assembly 18 and components thereof for changing an angle of the first elongate member 14 relative to the second elongate member 16. The hinge assembly is not intended to limit the adjustable butt assembly to any specific angle and is generally lockable in at least two positions, e.g., a linear position, wherein the first and second elongate members 14, 16 are linearly aligned or are configured to provide one or more curvilinear positions, wherein the first elongate member is at a fixed angle relative to the second elongate member 16.

Figure 10:
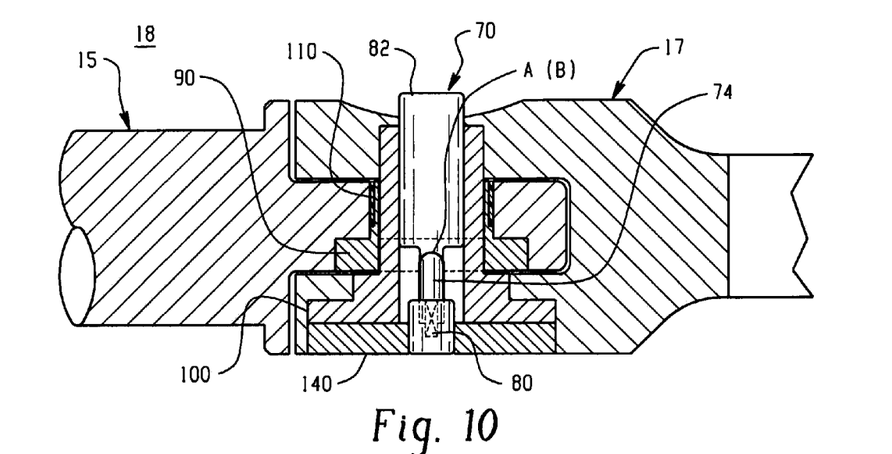
FIGS. 10-11 depict various views of an exemplary spring loaded button hinge for the fishing butt in accordance with an embodiment of the disclosure.
Figure 11:
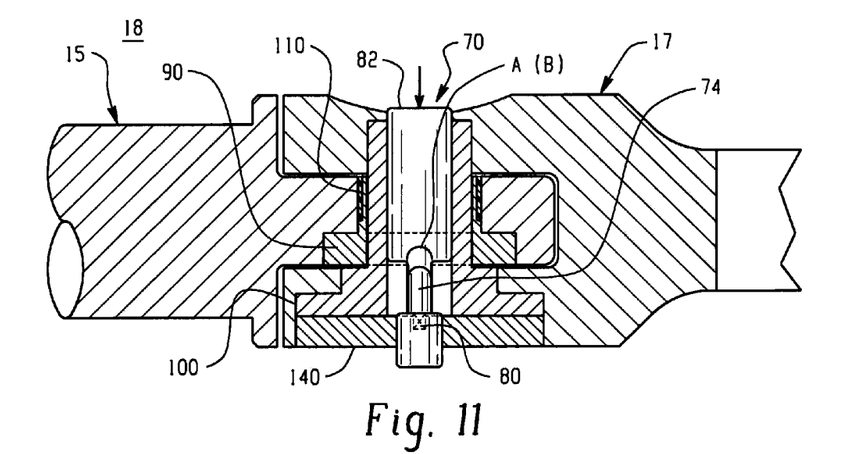
Figure 12:
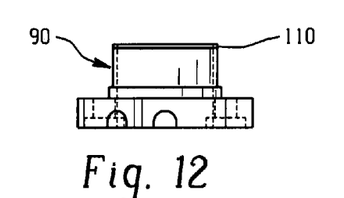
FIGS. 12-13 depict a side perspective view and a top down view of an upper housing component of the spring loaded button hinge assembly in accordance with an embodiment.
Figure 13:
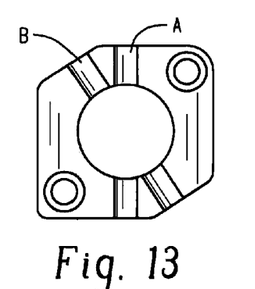

In FIG. 10, the hinge assembly 18 is shown in a locked configuration, wherein elongate member 14 is in a static relationship relative to elongate member 16, i.e., locked in either a linear or curvilinear relationship at a fixed angle. In FIG. 11, the hinge assembly 18 is shown in an unlocked configuration; wherein elongate member 14 can hingeably move relative to elongate member 16, e.g., freely move to a linear or curvilinear position. The hinge assembly 18 hingeably couples a U-shaped end 17 of elongate member 16 to a link end 15 of the elongate member 14 that is received in the U-shaped end 17. A spring loaded button 70 is provided to engage and disengage the hinge assembly 18 so as to permit relative movement and positioning of the elongate members 14, 16 as will be described in greater detail below.

Figure 14:
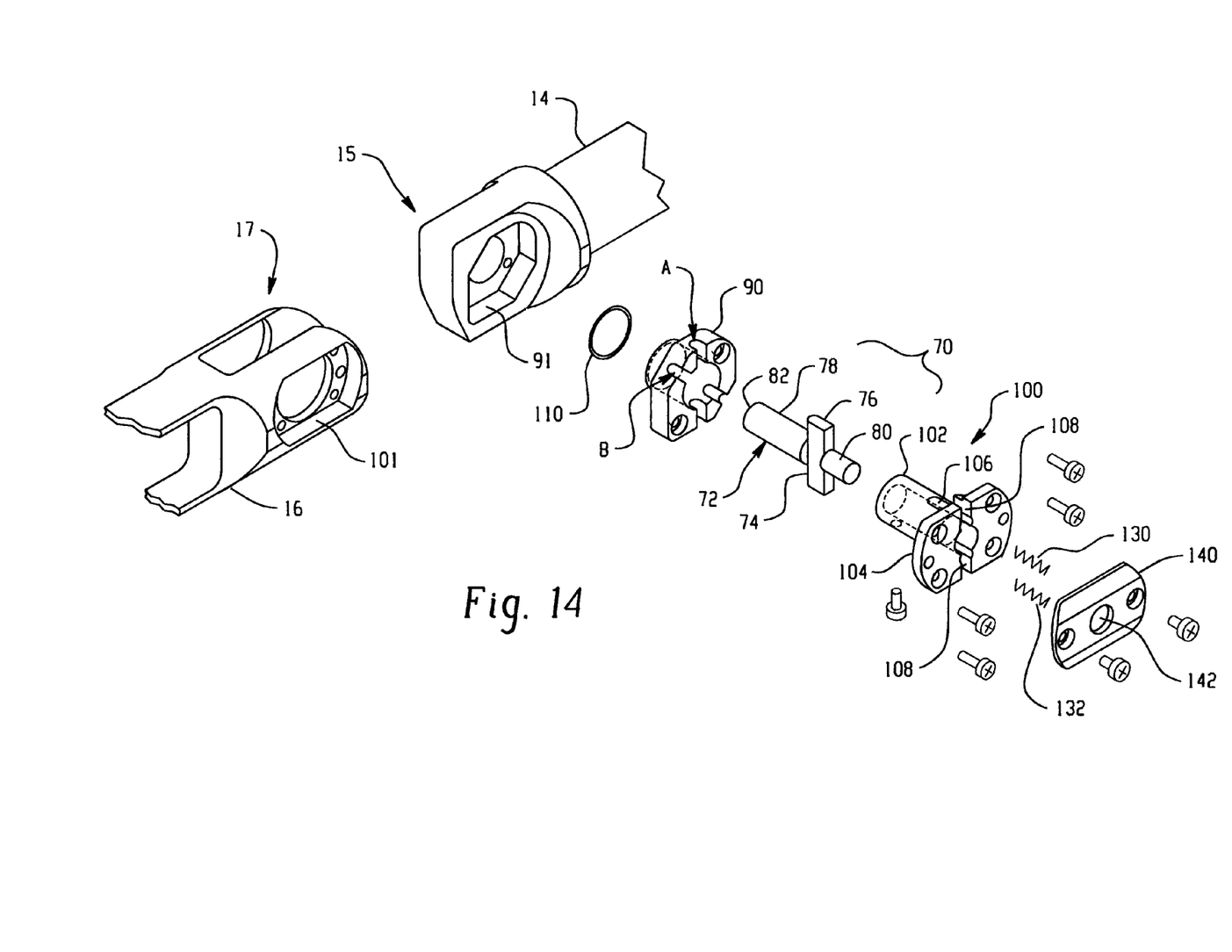
FIG. 14 depicts an exploded view of the spring loaded button hinge of FIGS. 10-13.

Referring now to FIG. 14, there is depicted an exploded view showing the various components defining the hinge assembly 18. The various components are seated within respective recesses 101, 91 formed in the U-shaped end 17 of elongate member 16 and linked end 15 of elongate member 14. The hinge assembly 18 includes a spring-loaded button 70 that is generally cross-shaped comprising an elongated linear body 72 having members 74, 76 transverse to a long axis of the body. The spring loaded button 70 extends between and hingeably couples the elongate members 14, 16 to one another.

The elongated linear body 72 includes a proximal portion 78 extending in one direction from the transverse members 74, 76 and a distal portion 80 extending in an opposite direction from the transverse members 74, 76. The proximal portion 78 includes a contact surface (82 as shown more clearly in FIGS. 10-11) that is depressed by a user to disengage the hinge assembly and effect relative positioning of the first and second elongate members 14, 16. The spring loaded button 70 is positioned between an upper housing component 90 and lower housing component 100.

The upper housing component 90 is dimensioned to seat within a complementary shaped recess 91 provided in one side of the linked end 15 of elongate member 14. The upper housing component 90 includes a cylindrical opening to slidably receive the proximal portion 78 of the spring loaded button 70 and has recessed notches A and B in a bottom surface that are dimensioned to receive and seat transverse members 74, 76 of the spring loaded button 70 when in use. The notches A, B relate to the angular position of the first elongate member 14 to the second elongate member 16. Although two notches are shown, additional notches can be provided to provide additional locked angular positions. In one embodiment, the locked angular positions of the elongate member 14 to elongate member 16 provide the adjustable butt with a linear relationship and at least one curvilinear relationship. In other embodiments, the hinge assembly 18 may be configured to provide the adjustable butt with only curvilinear relationships as may desired for some applications.

A thrust bushing 110 is coaxially aligned with the cylindrical opening of the upper housing component 90 and sandwiched between component 90 and a wall defining the recess 91. The thrust bushing 110 is configured to receive the proximal portion 78 of the spring loaded button 70 and permit rotational movement of selected one of the elongate member 14, 16 relative to the other elongate member 16, 14, respectively. Optionally, the thrust bushing can be replaced with a bearing or the like to prevent metal on metal contact at the interface between surfaces of the first and second elongate members. In one embodiment, the thrust bushing is formed of Teflon.

The lower housing component 100 is dimensioned to seat within a similarly shaped recess 101 provided in one side of the U-shaped end 17 of elongate member 16. The lower housing component 100 includes cylinder 102 at one end and flanges 104 at the other end. The flanges 104 abut a wall of the recess 101 and the cylinder 102 extends at least partly through the cylindrical opening of the upper housing component 90. Slots 106 (one of which is shown) extend through flange 104 to a partial length of the cylinder 102. The spring loaded button is inserted into the flange side of the lower housing component and the transverse members 74, 76 are aligned with the slots 106 to permit selective movement of the transverse members 74, 76 within the slots 106. The lower housing further includes corresponding grooves 108 to seat springs 130, 132, which are biased against cover plate 140 such that when the transverse members 74, 76 are aligned with a selected notch A or B by movement of the elongate member 14 relative to elongate member 16, the springs will exert a force against the transverse members 74, 76 to engage the transverse members with an aligned notch in the upper housing component 90 Since the transverse members 74, 76 are spring loaded, the transverse members 74, 76 can move into and out of a selected notch in the upper housing component 90 upon release and depression of the spring loaded button 70.

The cover plate 140 including aperture 142 is fastened to the upper housing component 90. The aperture 142 has a diameter corresponding to a diameter of the distal portion 80 of the spring loaded button 70. When the spring loaded button 70 is depressed, the springs 130, 132 are compressed and the transverse members 74, 76 slide within the slots 106 towards the flange 104 of the lower housing for a distance effective to disengage the transverse members from the notch so as to permit relative repositioning of the elongate members 14, 16. At least a portion of the spring loaded button 70 extends beyond plate 140 when the spring loaded button 70 is depressed.

Referring back to FIGS. 10 and 11, transverse member 74 is shown engaged in notch B (or A) and disengaged, respectively. The springs provide a biasing force against the transverse members 74 to maintain the hinge in a locked position once the transverse member is aligned with a selected notch. In FIG. 11, the spring loaded button surface 82 is manually depressed against the biasing of the springs. The spring loaded button 70 travels a distance effective to disengage the transverse member from the selected notch A or B, thereby permitting rotational movement of the elongate members relative to one another.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fishing rod butt for use with a fishing reel and a rod blank, comprising:
   a first elongate member having an open end configured to receive the rod blank and a link end;
   a second elongate member having a U-shaped end configured to receive the link end of the first elongate member; and
   a hinge assembly coupling the first and second elongate members and configured to releasably lock the first and second elongate members in at least two angular relationships, the hinge assembly comprising at least two notches and a spring-loaded button comprising an elongate body and at least one transverse member extending from a long axis thereof, the at least one transverse member engageable with a selected one of the at least two notches, wherein at least one spring biases the at least one transverse member into the selected one of the at least two notches such that depression of the spring-loaded button disengages the at least one transverse member from the selected one of the at least two notches to permit rotational movement of the first elongate member relative to the second elongate member, and wherein the at least two notches correspond to a different fixed angle defining the at least two angular relationships.

2. The fishing rod butt of claim 1, wherein the link end of the first elongate member comprises a recessed portion dimensioned to accommodate an upper housing component including an aperture configured to receive a proximal portion of the elongate body of the spring-loaded button, the upper housing component including a surface comprising the at least two notches; and the U-shaped end of the second elongate member comprises a recessed portion dimensioned to accommodate a lower housing component, the lower housing component including an aperture configured to receive a distal portion of the elongate body of the spring-loaded button and at least one slot dimensioned to accommodate sliding movement of the at least one transverse member upon depression of the spring-loaded button.

3. The fishing rod butt of claim 1, wherein the first elongate member further comprises an adjustable reel seat portion comprising a first annular hood abutting the hinge assembly, a second annular hood in spaced relationship to the first annular hood, and a nut abutting the second annular hood in threaded engagement with the first elongate member and configured to movably position the second annular hood relative to the first annular hood so as to retain the fishing reel between the first and second annular hoods, wherein the first and second annular hoods comprise at least one recessed portion configured to receive a fishing reel tongue of the fishing reel.

4. The fishing rod butt of claim 3, wherein the first elongate member further comprises a pin, and wherein the first annular hood comprises a recess configured to receive the pin and prevent rotation of the first annular hood.

5. The fishing rod butt and reel seat assembly of claim 3, wherein the nut is a collet nut and is coupled to the second annular hood.

6. The fishing rod butt of claim 1, wherein the second elongate member comprises a gimbal at an end of the second elongate member.

7. The fishing rod butt of claim 1, wherein the second elongate member further comprises at least one opening extending along a length of the second elongate member and dimensioned to accommodate a user's hands when in use.

8. The fishing rod butt of claim 1, wherein the first and second elongate members are formed of aluminum.

9. The fishing rod butt of claim 1, wherein the different fixed angles defining the at least two angular relationships comprise a linear relationship and at least one angled relationship.

10. The fishing rod butt of claim 1, wherein the different fixed angles defining the at least two angular relationships comprise at least two different angled relationships.

* * * * *